(12) United States Patent
Norbutas

(10) Patent No.: US 11,909,894 B2
(45) Date of Patent: *Feb. 20, 2024

(54) METHOD AND APPARATUS FOR GENERATING A DYNAMIC SECURITY CERTIFICATE

(71) Applicant: UAB 360 IT, Vilnius (LT)

(72) Inventor: Emanuelis Norbutas, Vilnius (LT)

(73) Assignee: UAB 360 IT, Vilnius (LT)

(*) Notice: Subject to any disclaimer, the term of this patent is extended or adjusted under 35 U.S.C. 154(b) by 0 days.

This patent is subject to a terminal disclaimer.

(21) Appl. No.: 18/076,887

(22) Filed: Dec. 7, 2022

(65) Prior Publication Data

US 2023/0163979 A1    May 25, 2023

Related U.S. Application Data

(63) Continuation of application No. 17/533,233, filed on Nov. 23, 2021, now Pat. No. 11,552,808.

(51) Int. Cl.
*H04L 29/06* (2006.01)
*H04L 9/32* (2006.01)
*H04L 9/40* (2022.01)

(52) U.S. Cl.
CPC ........ *H04L 9/3268* (2013.01); *H04L 63/0281* (2013.01)

(58) Field of Classification Search
CPC ..... H04L 9/3268; H04L 63/0281; H04L 9/40; H04L 63/0823
See application file for complete search history.

(56) References Cited

U.S. PATENT DOCUMENTS

| 8,392,712 | B1 | 3/2013 | Wilson | |
|---|---|---|---|---|
| 11,190,504 | B1* | 11/2021 | Ah Kun | H04L 9/3247 |
| 11,196,833 | B1* | 12/2021 | Norbutas | H04L 63/0272 |
| 2011/0167263 | A1 | 7/2011 | Cross et al. | |
| 2014/0006788 | A1 | 1/2014 | Ignatchenko | |
| 2015/0200935 | A1 | 7/2015 | Ikeda et al. | |
| 2016/0117492 | A1* | 4/2016 | Chabanne | H04L 9/3231 726/19 |
| 2017/0093587 | A1* | 3/2017 | Glisson | H04L 63/062 |
| 2018/0097638 | A1 | 4/2018 | Haldenby et al. | |
| 2018/0212782 | A1 | 7/2018 | Csik et al. | |
| 2021/0344511 | A1 | 11/2021 | Devarajan et al. | |
| 2022/0116230 | A1* | 4/2022 | Dietrich | H04L 63/0823 |

OTHER PUBLICATIONS

Jøsang, Audun, and Simon Pope. "User centric identity management." AusCERT Asia Pacific information technology security conference. vol. 22. 2005. (Year: 2005).*

* cited by examiner

*Primary Examiner* — Ka Shan Choy
(74) *Attorney, Agent, or Firm* — Moser Taboada

(57) ABSTRACT

A method and apparatus for generating a dynamic security certificate. The method creates an entropic element from user input, receives metadata from user input and generates a dynamic security certificate using the entropic element and the metadata. The dynamic security certificate is then trusted through user input.

20 Claims, 3 Drawing Sheets

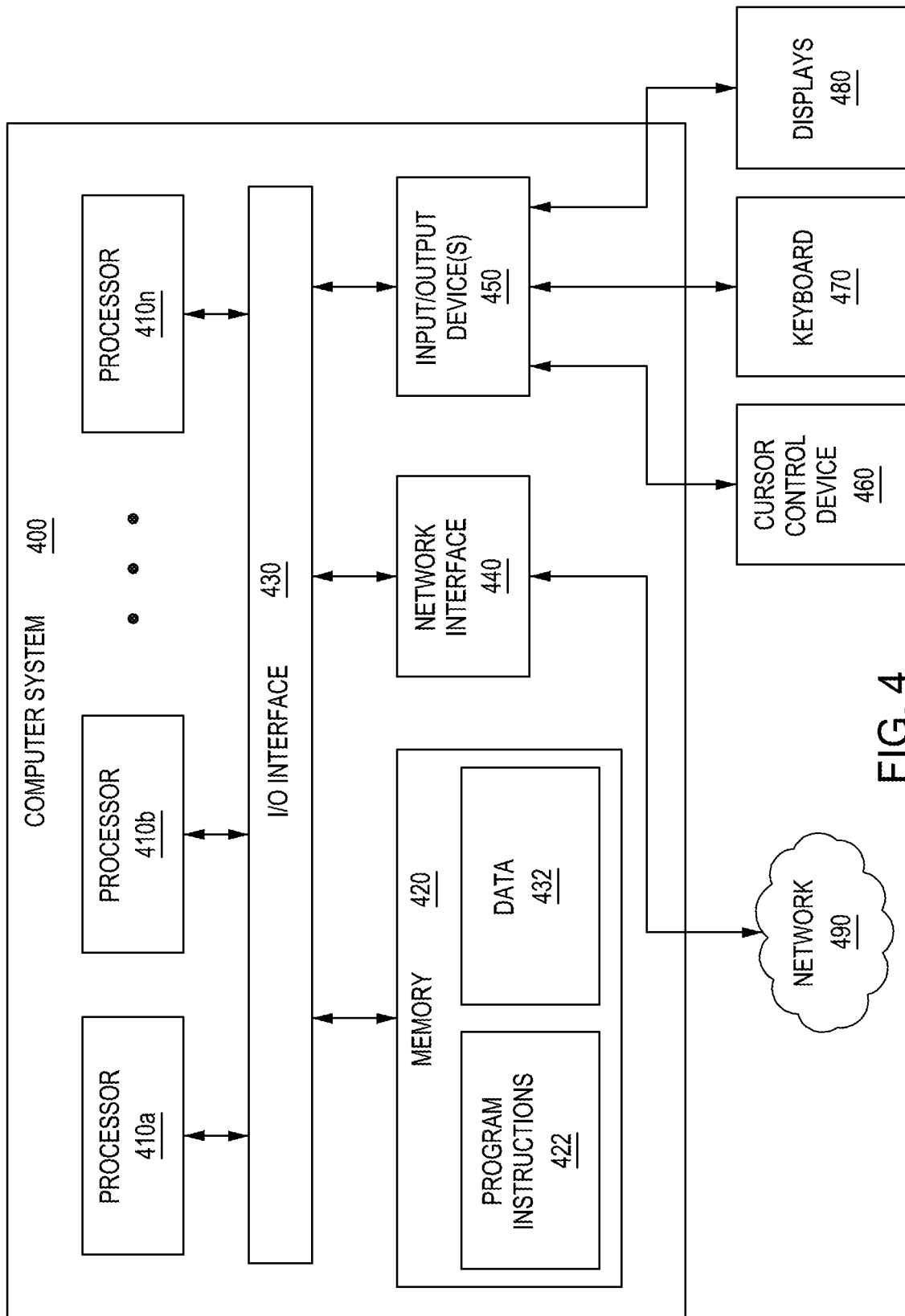

METHOD AND APPARATUS FOR GENERATING A DYNAMIC SECURITY CERTIFICATE

CROSS-REFERENCE TO RELATED APPLICATIONS

This application is a continuation of co-pending U.S. patent application Ser. No. 17/533,233, filed Nov. 23, 2021, the entire contents of which are incorporated by reference herein.

FIELD

The present invention relates generally to Internet security protocols, and more particularly to a system and method for generating dynamic security certificates.

BACKGROUND

Data traffic flow on the Internet is secured using security certificates (i.e., secure sockets layer (SSL) certificates). Security certificates are supplied to web servers from trusted certificate authorities such that a client application, (e.g., a web browser), executing on a user device may securely access the web server and securely receive data from the web server. Using certificates, the server's data (e.g., web page content) is transmitted using Transport Layer Security (TSL) to send encrypted data to the user device. Unfortunately, the data from a web server may carry a virus or malware which, when received by the user device, may infect the device. Because the data is encrypted until the user device application (e.g., browser) receives the data, any malware or virus detection application executing on the user device has no ability to inspect the encrypted data. Consequently, the encrypted data may carry viruses and malware into the user device.

To provide access to the encrypted data flow for inspection, a man-in-the-middle (MITM) proxy technique can be used to enable anti-malware/virus software to have access to the data. To do so, the MITM proxy application must convince the client application that it is connected to the server and convince the server that it is connected to the client application. To accomplish this deception, the MITM proxy application automatically generates a "dummy" certificate (e.g., a dynamic or self-signed certificate) to convince the client application is connected to the server and allow the MITM proxy application to decrypt the data flow and enable monitoring for malware or viruses.

The dynamic certificates used in a MITM proxy application are automatically generated without user input, monitoring, or understanding. Since these automatically generated certificates do not require input from the user or any indication of trust from the user, such automatically generated certificates may be recognized by the client application as a security risk and may cause the application to disconnect from the proxy application.

Therefore, there is a need for improved methods and apparatuses for generating security certificates.

SUMMARY

A method and apparatus for generating a dynamic security certificate. The method creates an entropic element from user input, receives metadata from user input, and generates a dynamic security certificate using the entropic element and the metadata. The dynamic security certificate is then trusted through user input and can be used as any certificate disseminated by a trusted certificate authority.

Other and further embodiments in accordance with the present principles are described below.

BRIEF DESCRIPTION OF THE DRAWINGS

So that the manner in which the above recited features of the present principles can be understood in detail, a more particular description of the principles, briefly summarized above, may be had by reference to embodiments, some of which are illustrated in the appended drawings. It is to be noted, however, that the appended drawings illustrate only typical embodiments in accordance with the present principles and are therefore not to be considered limiting of its scope, for the principles may admit to other equally effective embodiments.

FIG. 4 depicts a high-level block diagram of a computing device suitable for use with embodiments of a system for generating a dynamic security certificate in accordance with at least one embodiment of the invention.

Figure 1:
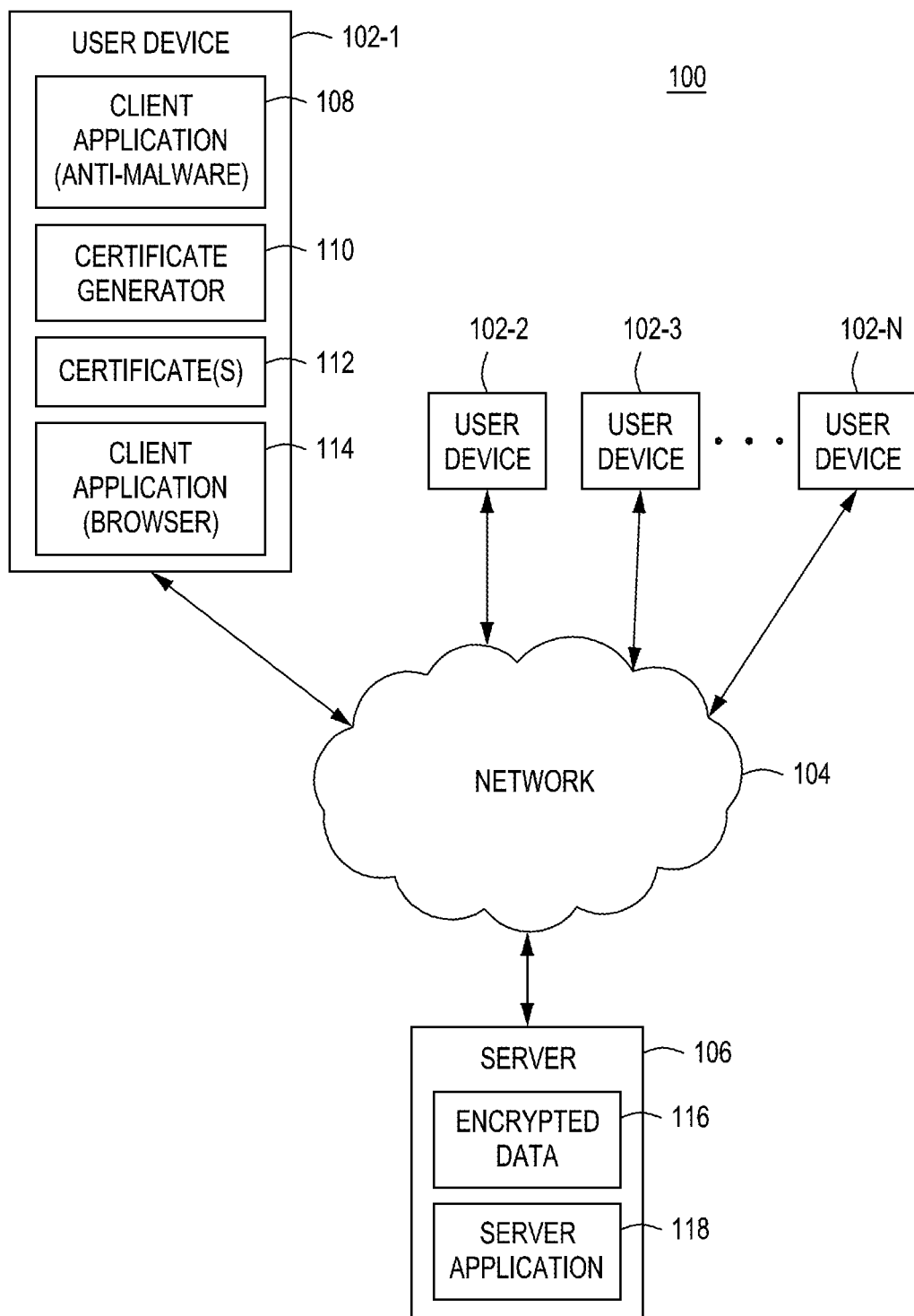
FIG. 1 illustrates an example of a computer system for generating a dynamic security certificate in accordance with at least one embodiment of the invention.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

DETAILED DESCRIPTION

The following detailed description describes techniques (e.g., methods, processes, apparatuses, and systems) for generating dynamic security certificates. While the concepts of the present principles are susceptible to various modifications and alternative forms, specific embodiments thereof are shown by way of example in the drawings and are described in detail below. It should be understood that there is no intent to limit the concepts of the present principles to the particular forms disclosed. On the contrary, the intent is to cover all modifications, equivalents, and alternatives consistent with the present principles and the appended claims.

Embodiments consistent with the present invention generate dynamic security certificates. In some embodiments, the certificate is generated with user input. The user creates an entropic element, enters metadata, and enters an expiration date. From these entries, a security certificate (e.g., SSL certificate) is generated and the user trusts the certificate. Since the user created their own certificate, they can trust that it is legitimate. Thereafter, the certificate can be used as any trusted security certificate is used. In one embodiment, the certificate is used in a proxy application such as, for example, but not limited to, a "man-in-the-middle" MITM proxy application. The application, for example, may be a portion of an anti-malware or anti-virus application that, by using the dynamic certificate, is capable of monitoring data flowing from a server to a user device application (e.g., browser).

Thus, methods and apparatuses consistent with embodiments of this present invention generate dynamic security certificates. Such certificates may be used to facilitate data flow monitoring to/from a user device. Details of such methods and apparatuses are described in detail below with respect to the figures.

FIG. 1 illustrates an example of a computer system 100 for generating a dynamic security certificate in accordance with at least one embodiment of the invention. In FIG. 1, the system 100 comprises at least one user device 102, a server 106, and a computer network 104, (e.g., the Internet) connecting the server 106 to the user devices 102. The server 106 is a centralized computing device used to execute the application(s) (server application 118) and communicate encrypted data 116 to/from user devices 102. The general structure of such a server and/or user device is described in detail below with respect to FIG. 4.

User devices 102-1, 102-2, 102-3 . . . 102-N (collectively referred to as user devices 102) communicate through network 104 with the server 106. In some embodiments, user device 102 can be any computing device capable of hosting a client application 108 and 114 (e.g., anti-malware or anti-virus application 108 and browser 114). User device 102 can comprise any device that is connected to a network, including, for example, a laptop, a mobile phone, a tablet computer, a desktop computer, a smart device, a router, and other network devices. Each user device 102 comprises client application software (browser) 114, at least one certificate 112 and a client application (anti-malware) 108. In one embodiment, the client application 108 may comprise a certificate generator 110. However, in other embodiments, the certificate generator 110 may be a stand-alone application that may be accessed and used by various client applications 108. The browser 114 is a well-known application for accessing and displaying web page content. Such browsers include, but are not limited to, Safari®, Chrome®, Explorer®, Firefox®, etc.

In operation, the client application 108 may be, for example, an anti-malware application that, to effectively protect the user device 102, requires access to encrypted data flowing to the user device 102. The client application 108 uses the certificate generator 110 to generate dynamic security certificate(s). To generate such a certificate (FIG. 3 and accompanying text describe the process in detail), the user creates an entropic element (a random value) for key creation and supplies metadata and an optional certificate expiration date. Using this information, the generator 110 generates a certificate that, since the user interactively created it, can be fully trusted as if it were from a certificate authority. The certificate can then be used by a MITM proxy application (e.g., anti-malware application 108) to monitor data flow to the user device 102.

Figure 2:
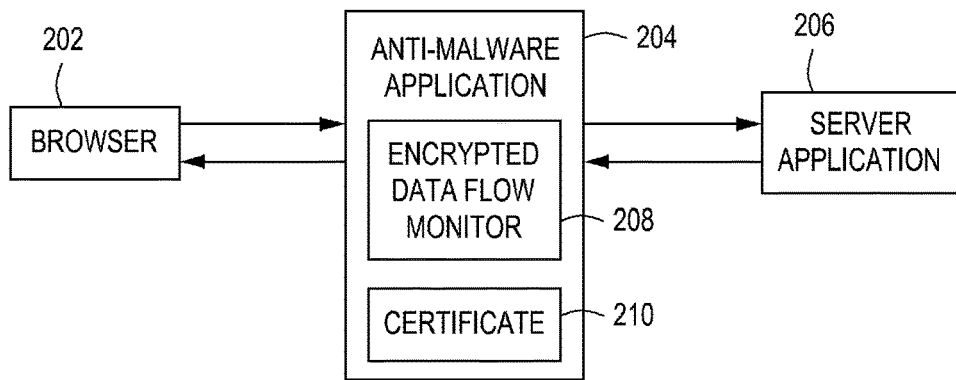
FIG. 2 depicts a block diagram of a specific use case for a dynamic certificate generated by the system of FIG. 1 in accordance with at least one embodiment of the present invention.

FIG. 2 depicts a block diagram of a specific use case 200 for a dynamic certificate generated by the system 100 of FIG. 1 in accordance with at least one embodiment of the present invention. The use case 200 utilizes a dynamic certificate 210 to enable an anti-malware application 204 to monitor data traffic between a browser 202 and a server application 206. The anti-malware application 204 or portion thereof is an exemplary form of a MITM proxy application that may utilize a dynamic certificate 210. Other forms of proxy applications include, but are not limited to, anti-virus applications, software testing applications, privacy measurement applications, software debugging applications, and the like. The proxy application may be a MITM proxy application but does not have to be MITM.

More specifically, the use case 200 comprises a browser 202 that is capable of sending and receiving data from a server application 206. The browser 202 renders content served by the server application 206 for viewing by a user. As described in detail with respect to FIG. 3 below, when the anti-malware application 204 is installed or when a certificate has expired, the application interacts with a user to generate the dynamic certificate 210. Once generated, the certificate 210 is used by the encrypted data flow monitor 208 (a portion of the anti-malware application) to decrypt and examine the data flow to ensure the data does not contain any malware.

Figure 3:
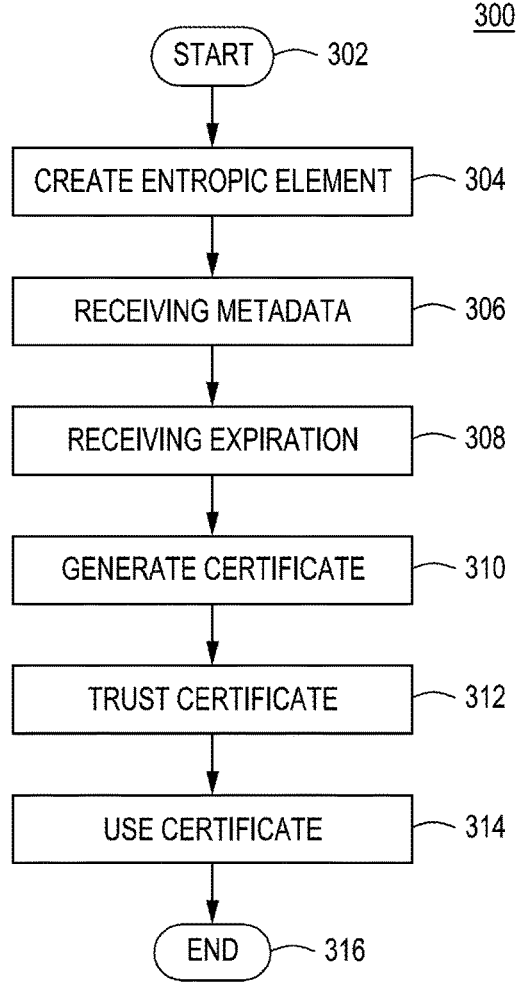
FIG. 3 is a flow diagram of a method for generating a dynamic security certificate in accordance with at least one embodiment of the present invention.

FIG. 3 illustrates an exemplary flow diagram representing one or more of the processes as described herein. Each block of the flow diagram may represent a module of code to execute and/or combinations of hardware and/or software configured to perform one or more processes described herein. Though illustrated in a particular order, the following figures are not meant to be so limiting. Any number of blocks may proceed in any order (including being omitted) and/or substantially simultaneously (i.e., within technical tolerances of processors, etc.) to perform the operations described herein.

FIG. 3 is a flow diagram of a method 300 for generating a dynamic security certificate in accordance with at least one embodiment of the present principles. In some embodiments, method 300 is executed upon installation of a proxy application (e.g., a portion of the anti-malware application) and, in other embodiments, the method 300 is executed when an expired security certificate requires replacement. The method 300 may be implemented to interact with the user via a graphical user interface that depicts each step of the method and asks interactive questions to gather information for generating a dynamic certificate. In some embodiments, the method 300 begins at 302 and proceeds to 304 where a user creates an entropic element (e.g., a random value). In other embodiments, the entropic element is an inputted character sequence from the user or may be supplied from a file through cut and paste or through automatic copying from the source file. The entropic element may be supplied by the operating system of the user device such as a user device processor temperature measurement, mouse movements, fan noise, keyboard use, network traffic, input/output devices/circuits data flow (e.g., disk drives, USB attached devices, graphic cards, other peripherals, etc. Typically, each user device has a known technique for generating random values that is accessible via the operating system. To create the entropic element, the user may select a source of the entropic element for the particular user device from a list of entropic element sources. If the particular user device has only one entropic element source, then the user will have only a single source to select. The entropic element is used to generate a private key for the certificate.

At 306, the method 300 receives metadata for the certificate as entered by the user. The metadata may include, but not limited to, the user's name, contact information, personal information, etc. Metadata may be supplied from a root certificate either manually, by the user copy and paste, or automatically, through an automated copying script or procedure. The metadata may be a combination of a root certificate's metadata and user inputted metadata. At 308, the method may receive an optional expiration date for the certificate as entered by the user. The user may use a keyboard or keypad to enter the metadata and expiration date. At 310, the method 300 generates the dynamic security certificate. At 312, the user indicates that the user trusts the newly created security certificate. Such indication may be performed through a user interface that queries the user to select a button or make some other indication to trust the certificate. At 314, the certificate is used by the MITM proxy application to facilitate data flow inspection. The method 300 ends at 316.

The dynamic security certificate generated as described above may be used as a root certificate or an intermediate certificate. From an intermediate certificate, additional dynamic certificates may be added to form a certificate chain. In other words, a dynamic certificate created and trusted as described herein may be used in the same manner as a certificate disseminated by a Certificate Authority.

FIG. 4 depicts a computer system 400 that can be utilized in various embodiments of the present invention to implement the computer and/or the display, according to one or more embodiments.

Various embodiments of method and system for generating a dynamic secure certificate, as described herein, may be executed on one or more computer systems, which may interact with various other devices. One such computer system is computer system 400 illustrated by FIG. 4, which may in various embodiments implement any of the elements or functionality illustrated in FIGS. 1-3. In various embodiments, computer system 400 may be configured to implement methods described above. The computer system 400 may be used to implement any other system, device, element, functionality or method of the above-described embodiments. In the illustrated embodiments, computer system 400 may be configured to implement the user devices 102 and server 106 and implement the method 300 as processor-executable executable program instructions 422 (e.g., program instructions executable by processor(s) 410) in various embodiments.

In the illustrated embodiment, computer system 400 includes one or more processors 410a-410n coupled to a system memory 420 via an input/output (I/O) interface 430. Computer system 400 further includes a network interface 440 coupled to I/O interface 430, and one or more input/output devices 450, such as cursor control device 460, keyboard 470, and display(s) 480. In various embodiments, any of the components may be utilized by the system to receive user input described above. In various embodiments, a user interface may be generated and displayed on display 480. In some cases, it is contemplated that embodiments may be implemented using a single instance of computer system 400, while in other embodiments multiple such systems, or multiple nodes making up computer system 400, may be configured to host different portions or instances of various embodiments. For example, in one embodiment some elements may be implemented via one or more nodes of computer system 400 that are distinct from those nodes implementing other elements. In another example, multiple nodes may implement computer system 400 in a distributed manner.

In different embodiments, computer system 400 may be any of various types of devices, including, but not limited to, a personal computer system, desktop computer, laptop, notebook, tablet or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In various embodiments, computer system 400 may be a uniprocessor system including one processor 410, or a multiprocessor system including several processors 410 (e.g., two, four, eight, or another suitable number). Processors 410 may be any suitable processor capable of executing instructions. For example, in various embodiments processors 410 may be general-purpose or embedded processors implementing any of a variety of instruction set architectures (ISAs). In multiprocessor systems, each of the processors 410 may commonly, but not necessarily, implement the same ISA.

System memory 420 may be configured to store program instructions 422 and/or data 432 accessible by processor 410. In various embodiments, system memory 420 may be implemented using any non-transitory computer readable media including any suitable memory technology, such as static random-access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 420. In other embodiments, program instructions and/or data may be received, sent or stored upon different types of computer-accessible media or on similar media separate from system memory 420 or computer system 400.

In one embodiment, I/O interface 430 may be configured to coordinate I/O traffic between processor 410, system memory 420, and any peripheral devices in the device, including network interface 440 or other peripheral interfaces, such as input/output devices 450. In some embodiments, I/O interface 430 may perform any necessary protocol, timing or other data transformations to convert data signals from one component (e.g., system memory 420) into a format suitable for use by another component (e.g., processor 410). In some embodiments, I/O interface 430 may include support for devices attached through various types of peripheral buses, such as a variant of the Peripheral Component Interconnect (PCI) bus standard or the Universal Serial Bus (USB) standard, for example. In some embodiments, the function of I/O interface 430 may be split into two or more separate components, such as a north bridge and a south bridge, for example. Also, in some embodiments some or all of the functionality of I/O interface 430, such as an interface to system memory 420, may be incorporated directly into processor 410.

Network interface 440 may be configured to allow data to be exchanged between computer system 400 and other devices attached to a network (e.g., network 490), such as one or more external systems or between nodes of computer system 400. In various embodiments, network 490 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 440 may support communication via wired or wireless general data networks, such as any suitable type of Ethernet network, for example; via digital fiber communications networks; via storage area networks such as Fiber Channel SANs, or via any other suitable type of network and/or protocol.

Input/output devices 450 may, in some embodiments, include one or more display terminals, keyboards, keypads, touchpads, scanning devices, voice or optical recognition devices, or any other devices suitable for entering or accessing data by one or more computer systems 400. Multiple input/output devices 450 may be present in computer system 400 or may be distributed on various nodes of computer system 400. In some embodiments, similar input/output devices may be separate from computer system 400 and may interact with one or more nodes of computer system 400 through a wired or wireless connection, such as over network interface 440.

In some embodiments, the illustrated computer system may implement any of the operations and methods described above, such as the methods illustrated by the flowchart of FIG. 3. In other embodiments, different elements and data may be included.

Those skilled in the art will appreciate that computer system 400 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, and the like. Computer system 400 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 400 may be transmitted to computer system 400 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description on a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, and the like), ROM, and the like.

The methods described herein may be implemented in software, hardware, or a combination thereof, in different embodiments. In addition, the order of methods may be changed, and various elements may be added, reordered, combined, omitted or otherwise modified. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

In the foregoing description, numerous specific details, examples, and scenarios are set forth in order to provide a more thorough understanding of the present disclosure. It will be appreciated, however, that embodiments of the disclosure may be practiced without such specific details. Further, such examples and scenarios are provided for illustration, and are not intended to limit the disclosure in any way. Those of ordinary skill in the art, with the included descriptions, should be able to implement appropriate functionality without undue experimentation.

References in the specification to "an embodiment," etc., indicate that the embodiment described may include a particular feature, structure, or characteristic, but every embodiment may not necessarily include the particular feature, structure, or characteristic. Such phrases are not necessarily referring to the same embodiment. Further, when a particular feature, structure, or characteristic is described in connection with an embodiment, it is believed to be within the knowledge of one skilled in the art to affect such feature, structure, or characteristic in connection with other embodiments whether or not explicitly indicated.

Embodiments in accordance with the disclosure may be implemented in hardware, firmware, software, or any combination thereof. Embodiments may also be implemented as instructions stored using one or more machine-readable media, which may be read and executed by one or more processors. A machine-readable medium may include any mechanism for storing or transmitting information in a form readable by a machine (e.g., a computing device or a "virtual machine" running on one or more computing devices). For example, a machine-readable medium may include any suitable form of volatile or non-volatile memory.

Modules, data structures, and the like defined herein are defined as such for ease of discussion and are not intended to imply that any specific implementation details are required. For example, any of the described modules and/or data structures may be combined or divided into sub-modules, sub-processes or other units of computer code or data as may be required by a particular design or implementation.

In the drawings, specific arrangements or orderings of schematic elements may be shown for ease of description. However, the specific ordering or arrangement of such elements is not meant to imply that a particular order or sequence of processing, or separation of processes, is required in all embodiments. In general, schematic elements used to represent instruction blocks or modules may be implemented using any suitable form of machine-readable instruction, and each such instruction may be implemented using any suitable programming language, library, application-programming interface (API), and/or other software development tools or frameworks. Similarly, schematic elements used to represent data or information may be implemented using any suitable electronic arrangement or data structure. Further, some connections, relationships or associations between elements may be simplified or not shown in the drawings so as not to obscure the disclosure.

Example Clauses A. A method for generating a dynamic security certificate comprising:
   creating an entropic element from user input;
   receiving metadata from user input;
   generating a dynamic security certificate using the entropic element and the metadata; and
   trusting, through user input, the dynamic security certificate.
B. The method of clause A, wherein creating the entropic element further comprises selecting the entropic element from a list of entropic elements.
C. The method of clauses A or B, wherein the list comprises one or more of a user device processor temperature measurement, mouse movements, fan noise, or keyboard use, network traffic, or data flow between input/output devices or circuits of the user device.
D. The method of clauses A-C, further comprising using the dynamic security certificate in a man-in-the-middle (MITM) proxy application.
E. The method of clauses A-D, wherein the MITM application monitors data flowing between a client application and a server application.
F. The method of clauses A-E, wherein the MITM application is an anti-malware application, an anti-virus application, a software debugging application, privacy measurement application or a software testing application.
G. The method of clauses A-F, wherein the metadata comprises one or more of a name of a user, user contact information, user personal information.
H. The method of clauses A-G, further comprising creating a private key using the entropic element.
I. The method of clauses A-H, wherein the method is performed upon execution of the MITM application.
J. The method of clauses A-I, further comprising receiving an expiration date for the dynamic security certificate from user input.
K. Apparatus for generating a dynamic security certificate comprising at least one processor coupled to at least one non-transitory computer readable medium having instructions stored thereon, which, when executed by the at least one processor, cause the at least one processor to perform operations comprising:
   creating an entropic element from user input;
   receiving metadata from user input;
   generating a dynamic security certificate using the entropic element and the metadata; and
   trusting, through user input, the dynamic security certificate.
L. The apparatus of clause K, wherein creating the entropic element further comprises selecting the entropic element from a list of entropic elements.
M. The apparatus of clauses K or L, wherein the list comprises one or more of a user device processor temperature measurement, mouse movements, fan noise, or keyboard use, network traffic, or data flow between input/output devices or circuits of the user device.
N. The apparatus of clauses K-M, further comprising using the dynamic security certificate in a man-in-the-middle (MITM) proxy application.
O. The apparatus of clauses K-N, wherein the MITM application monitors data flowing between a client application and a server application.
P. The apparatus of clauses K-O, wherein the MITM application is an anti-malware application, an anti-virus application, a software debugging application, privacy measurement application or a software testing application.
Q. The apparatus of clauses K-P, wherein the metadata comprises one or more of a name of a user, user contact information, user personal information.
R. The apparatus of clauses K-Q, further comprising creating a private key using the entropic element.
S. The apparatus of clauses K-R, wherein the method is performed upon execution of the MITM application.
T. The apparatus of clauses K-S, further comprising receiving an expiration date for the dynamic security certificate from user input.

What is claimed is:

1. A method for generating a dynamic security certificate comprising:
   identifying, from a first user input, at least one sequence of values associated with a user, wherein the first user input comprises data unrelated to an identifying characteristic of the user;
   receiving metadata including at least one identifying characteristic of the user;
   generating a dynamic security certificate using the at least one sequence of values and the metadata; and
   enabling a user, through a second user input, verify that the dynamic security certificate can be trusted; and
   using the dynamic security certificate, as generated and trusted, access encrypted user data, via a proxy.

2. The method of claim 1, wherein the first user input comprises at least one of a characteristic of a device of the user or random data values associated with the user.

3. The method of claim 2, wherein the characteristic of the device of the user comprises one or more of a user device processor temperature measurement, fan noise, network traffic, data flow between input/output devices, or circuits of the user device.

4. The method of claim 1, wherein the at least one sequence of values comprises an entropic element and the identifying at least one sequence of values further comprises selecting the entropic element from a list of entropic elements.

5. The method of claim 1, further comprising using the dynamic security certificate in a man-in-the-middle (MITM) proxy application, which monitors data flowing between a client application and a server application.

6. The method of claim 5 wherein the MITM proxy application is a portion of an anti-malware application, an anti-virus application, a software debugging application, privacy measurement application or a software testing application.

7. The method of claim 1, wherein the metadata comprises one or more of a name of a user, user contact information, and user personal information.

8. The method of claim 1, further comprising creating a private key using the at least one sequence of values.

9. The method of claim 1, wherein the method is performed upon execution of an MITM proxy application.

10. The method of claim 1, further comprising receiving an expiration date for the dynamic security certificate from a third user input.

11. An apparatus for generating a dynamic security certificate comprising at least one processor coupled to at least one non-transitory computer readable medium having instructions stored thereon, which, when executed by the at least one processor, cause the at least one processor to perform operations comprising:
- identifying, from a first input, at least one sequence of values associated with a user, wherein the first user input comprises data unrelated to an identifying characteristic of the user;
- receiving metadata including at least one identifying characteristic of the user;
- generating a dynamic security certificate using the at least one sequence of values and the metadata; and
- enabling a user, through a user input, verify that the dynamic security certificate can be trusted;
- wherein the dynamic security certificate, as generated and trusted, is implemented by a proxy to access encrypted user data.

12. The apparatus of claim 11, wherein the first input comprises at least one of a characteristic of a device of the user or random data values associated with the user.

13. The apparatus of claim 12, wherein the at least one characteristic of the user device comprises one or more of a user device processor temperature measurement, fan noise, network traffic, data flow between input/output devices, or circuits of the user device.

14. The apparatus of claim 11 wherein identifying at least one sequence of values further comprises selecting the at least one sequence of values from a list of sequences of values.

15. The apparatus of claim 11, further comprising using the dynamic security certificate in a man in the middle (MITM) proxy application, which monitors data flowing between a client application and a server application.

16. The apparatus of claim 15 wherein the MITM proxy application is a portion of an anti-malware application, an anti-virus application, a software debugging application, privacy measurement application or a software testing application.

17. The apparatus of claim 11, wherein the metadata comprises one or more of a name of a user, user contact information, user personal information.

18. The apparatus of claim 11, further comprising creating a private key using the at least one sequence of values.

19. The apparatus of claim 11, wherein the operations are performed upon execution of an MITM proxy application.

20. The apparatus of claim 11, further comprising receiving an expiration date for the dynamic security certificate from a third user input.

* * * * *